Jan. 11, 1938. H. B. INGLIS 2,105,148
PILOT DIRECTOR
Original Filed Feb. 8, 1930 2 Sheets-Sheet 1
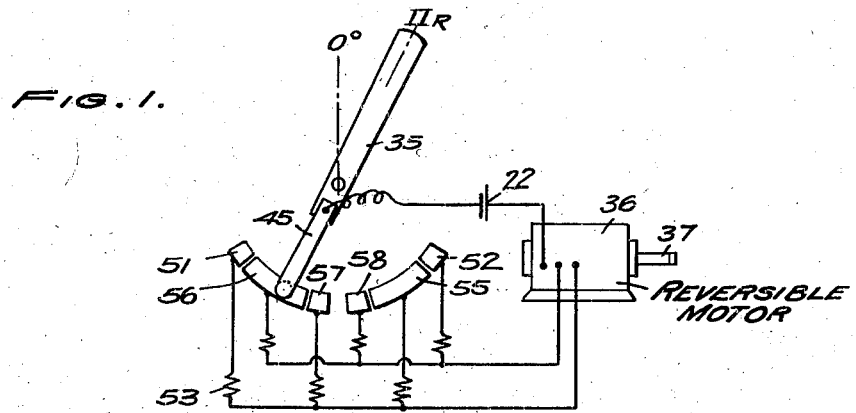
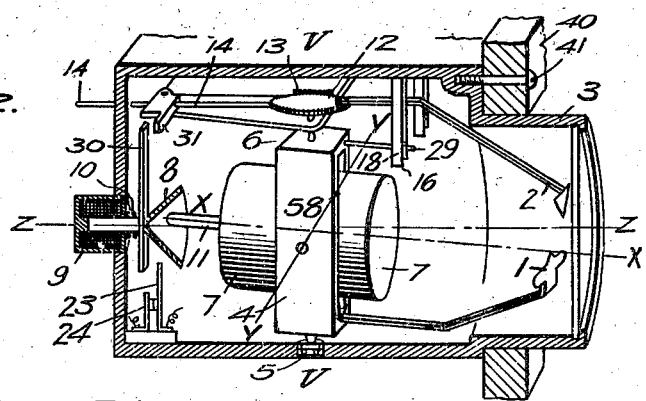
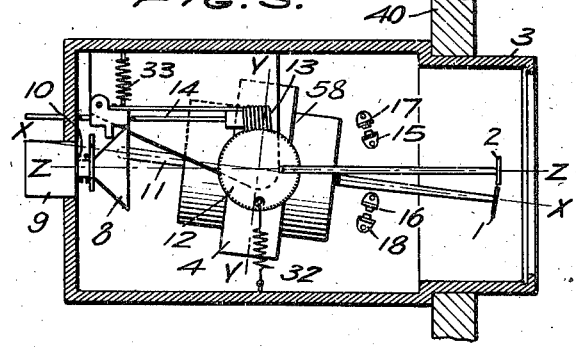
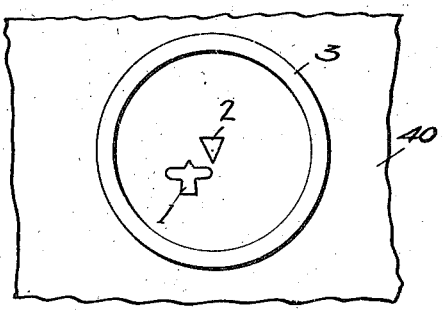
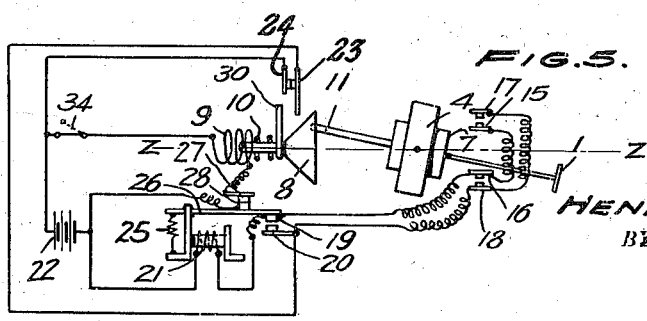
INVENTOR
HENRY B. INGLIS
ATTORNEYS Jan. 11, 1938. H. B. INGLIS 2,105,148
PILOT DIRECTOR
Original Filed Feb. 8, 1930 2 Sheets-Sheet 2
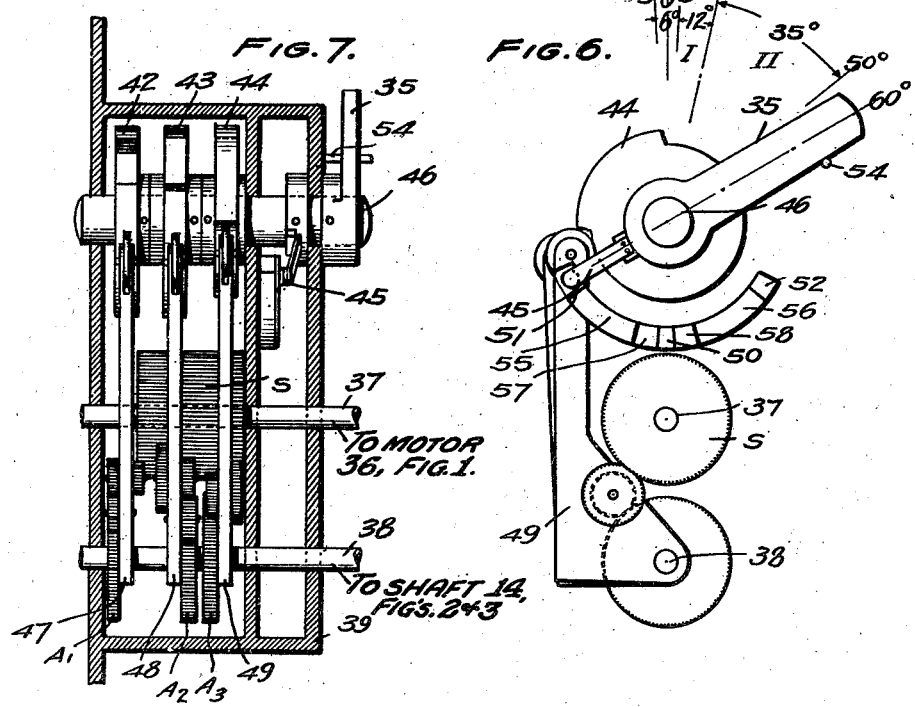
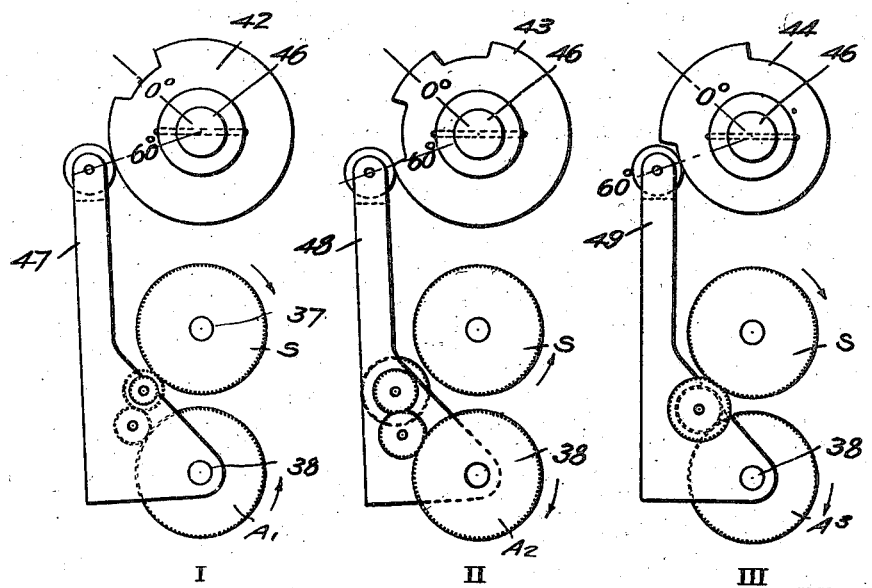
INVENTOR
HENRY B. INGLIS
ATTORNEYS Patented Jan. 11, 1938

2,105,148

UNITED STATES PATENT OFFICE 2,105,148

PILOT DIRECTOR

Henry B. Inglis, Fenton, Mich.

Original application February 8, 1930, Serial No. 426,808. Divided and this application January 15, 1935, Serial No. 1,971

8 Claims. (Cl. 33—204)

The present invention relates to the general class of computing mechanism and more specifically to mechanisms in combination with a process of sighting optical means for computing data for the aiming of projectors. It is a division of my former application, Serial No. 426,808, filed February 8, 1930, in which I have described an improved instrumental means for the guidance of the pilot of aircraft.

It is an object of my invention to supply a device whereby the course of an aircraft may be readily directed by a bomber or navigator remotely located from the pilot flying said aircraft.

It is a further object of my invention to provide a novel azimuth directing system whereby the course of an aircraft bomber may be quickly and effectively brought into coincidence with the plane of the target.

With the foregoing and other objects in view, which will appear as the description proceeds, the invention consists of certain new and novel improvements in pilot directors which will be hereinafter more fully illustrated and described in the accompanying drawings and more specifically pointed out in the appended claims.

Referring to the drawings, in which numerals of like character designate similar parts throughout the several claims:

Fig. 1 is a wiring diagram of the remote control portion of the pilot director.

Fig. 2 is a slightly tilted side elevation in partial cross-section of the indicating instrument.

Fig. 3 represents a plan view of the indicating instrument, in partial cross-section.

Fig. 4 shows the face of the indicating instrument.

Fig. 5 is a wiring diagram of the indicating portion of the pilot director.

Fig. 6 is a face view of the bomber's directional control.

Fig. 7 is a cross-sectional view of Fig. 6.

Fig. 8 shows the three cam faces of Fig. 7.

Referring to Figs. 2 and 3, I is a reference pointer and 2 is a second lubber pointer registering relatively in azimuth and movable about a vertical axis V—V passed thru a housing 3, secured to an aircraft by means of a panel 40 and screws 41. The reference pointer I is fixed to a gimbal ring 4 of a directional gyroscope 58. The gyroscope 58 is pivoted on bearings 5 and 6 such that the axis V—V intersects the longitudinal axis Z—Z of the housing 3. In the ring 4, on lateral axis Y—Y perpendicular to and intersecting the axis V—V, is pivoted a housing 7 in which the gyroscope rotor not here shown revolves about horizontal axis X—X, which intersects and lies at right angles to the axes V—V and Y—Y. This relation of the three axes constitutes well known "universal suspension" of a gyroscope, but unlike that of the reticule stabilizer gyroscope, which is pendular and "vertical seeking", I make the pilot director gyroscope "neutral", i. e., the three axes intersect the center of gravity of the gyro housing assembly so that rolling, pitching and accelerations of the craft have no tendency to move axis X—X out of parallelism with whatever direction it may have when released from locked engagement with the housing 3. The rotor may be secured to the armature of an electric motor. It will be seen that when the axis X—X is free, as shown in Figs. 2 and 3, i. e., a pin II forming an extension of the rotor housing 7 is not caged with respect to a cone 8. Thus any rotation of the craft about axis Y—Y, as in pitching or climbing, rotates the whole instrument assembly about Y—Y, with the exception of the rotor housing 7 and no relative movement is caused between the reference pointer I and the lubber pointer 2; but any turn of the craft in azimuth, about axis V—V, rotates the assembly including lubber pointer 2, while the gyroscopic stabilization of the axis X—X holds the ring 4 and attached reference pointer I from rotating, hence the lubber pointer 2 moves with reference to reference pointer I exactly corresponding to the degree of turn of the craft in azimuth only. Figs. 2 thru 4 illustrate relative movement of the lubber pointer 2 in a craft turn to the left, as 6°.

Unless a solenoid 9 be energized to pull the plunger of which the cone 8 is a part, into the uncaged position shown in Figs. 2, 3 and 5, the axis X—X is caged in coincident alignment with the axis Z—Z of the housing 3 by a spring 10 which pushes the cone 8 against the pin II. The lubber pointer 2, which always constitutes the pilot's index to which he holds the reference pointer I, by ruddering his craft, is attached to a worm wheel 12, and is displaceable in azimuth relation to the housing 3 by motive drive of a worm 13 and a shaft 14.

The worm 13 is meshed with the worm wheel 12 so long as the cone 8 is held free of the pin II, until either the reference pointer I or the lubber pointer 2 moves to right or left of the axis Z—Z, as viewed in Fig. 3, through some limiting arc such as 15°, where the lubber pointer 2 pushes one of a pair of limit contacts 15 and 17 or 16 and 18, causing automatic centering of both the reference pointer I and lubber pointer 2. Wiring diagram Fig. 5, shows how this may be accomplished. The limit contacts are electrically connected in parallel with contacts 19 and 20, and in series with a relay, 21, a battery 22, and contacts 23 and 24. A spring 25 normally holds an armature 26 in the position shown, in which contacts 19 and 20 are open, and contacts 27 and 28 are closed. The latter complete the circuit through the uncage solenoid 9 in series with a battery 22 and switch 34. The energized solenoid holds the cone 8 free of the pin 11 as shown in Figs. 2 and 3. But whenever either the reference pointer 1 or the lubber pointer 2 closes either pair of contacts at the limiting swing, the relay 21 is energized, pulling the armature 26 to break contacts 27 and 28, thus deenergizing the solenoid 9 allowing the spring 10 to cage axis X—X in coincident alignment with axis Z—Z, centering the lubber line 2; while a lug 30 forming a part of the cone 8, at the end of the spring caging stroke, impacts a lug 31 (shown in Fig. 2) of the worm bearing assembly, to force the worm 13 out of mesh with the worm wheel 12, allowing spring 32 (Fig. 3) to center the lubber pointer 2.

The bumper contacts 27 and 28 will be opened at the beginning of the caging stroke, hence to hold the relay armature 26 in open position of contacts 27 and 28 until the caging is completed, the relay circuit by-passes through the contacts 19 and 20, as soon as they close, and the armature remains in position of open contacts 27 and 28 until the end of the caging stroke, when the cone lug 30 forces contacts 23 and 24 apart, breaking the relay energizing circuit and allowing the spring 25 to force the armature 26 up to again close contacts 27 and 28 and re-energize solenoid 9, causing uncaging of the reference pointer 1; and also allowing the spring 33, shown in Fig. 3, again to mesh the worm 13 with the worm wheel 12. Thus any motive displacing of the lubber pointer 2, in accord with the bomber's control manipulation, and any turning of the craft indicated by movement of the lubber pointer 2 relative to the reference pointer 1, is interrupted but momentarily, and even then only in case either the reference pointer 1 or the lubber pointer 2 has departed from axis Z—Z by the limiting arc. If the entire alignment is done without exceeding such a limiting turn of craft axis $Z_1$—$Z_1$, lying parallel to axis Z—Z or rotation of the bomber's sight, which occurs simultaneously and in synchronized relation with the lubber pointer 2, then this centering action will not occur.

A working embodiment of the bomber's control is illustrated in Figs. 1 and 6 thru 8. It is comprised essentially of a manual control lever 35, displaceable to right and left of a neutral position marked 0°. The lever 35 actuates a motor device to change the relative speeds and directions of rotation of the shaft 14 and is displaceable in three selective combinations. The means illustrated comprises a simple commutator and contact brush, wired as shown in Fig. 1, for changing the direction of rotation of a reversible motor 36. A set of tumbler gears, as shown in Figs. 6 thru 8, are provided for changing the ratio between the shafts 37 and 38 which are in turn connected by flexible shaft drive to the motor 36 for effecting rotation of the bomb sight and the shaft 14 forming part of the pilot director shown in Figs. 2 thru 5.

Fig. 7 is a left side view of the assembled control in which 39 represents in section, a suitable frame attached to the craft body or for convenience of manipulation, to the bombsight instrument. Fig. 6 is a face view of Fig. 7, omitting, for clarity, frame 39 and all but #III cam and tumbler gear train.

Fig. 8 shows the three tumbler gear and cam combinations, for clarity separated, but corresponding to like numeraled parts of Fig. 7, side view.

Cams 42, 43, and 44, commutator brush 45, hub and control lever 35, are all fixed to shaft 46 and the cam notches are designed to push the rollers of the tumbler gear carrying arms 47, 48, and 49 so that only one gear combination I, II or III is meshed at a time between shafts 37 and 38 which corresponds to I, II or III control positions.

If the control be centered at 0°, all the cam axes marked 0° rotate to the 60° lines at the rollers, throwing combinations II and III out of mesh. It is not necessary to throw combination I out of mesh as brush 45 is then on the insulated neutral arc 50 and the motor drive of gear S is stopped.

The operation of the system will be clear by considering the gear S, shaft 37, (Fig. 6) as driven through any suitable connection by the motor 36 (Fig. 1) which also rotates the directional plane of sighting; and shaft 38 to be connected by any suitable means as flexible shafting, to shaft 14 (Fig. 3). Thus if the gear ratio between shafts 37, 38 were one to one, the lubber pointer 2 would be motive deflected the same degree as rotation of the sight. But the three control positions selectively mesh three different ratios between shafts 37 and 38, corresponding to the direction of sight rotation and controlled by the manual control lever 35.

Thus, if the control be pushed to position III to the right as in Fig. 6, the brush is on commutator segment 51 connected to motor 36 (see Fig. 1), causing the shaft 37 to drive gear S in the direction of the arrow adjacent thereto corresponding to rotation of the sight to the right, corresponding to push of the lever 35 to the right and concurrently meshing gear train III (of Fig. 8), driving gear $A_3$, shaft 38, in the direction of the arrow adjacent thereto, corresponding to deflection of the lubber pointer 2, also to the right, but at a somewhat faster rate than sight rotation. Assuming that the motor be designed to rotate the sight at 1° per second and gear ratio III to rotate the pointer at 1⅓° per second, then if the bomber holds control position III for one second, the pilot in holding the lubber pointer 2 into coincidence with reference pointer 1, will turn the craft axis 1⅓° while the sight is rotated 1° to the right relative to the craft body, but 2⅓° (=1 plus 1⅓) to the right relative to the ground.

The gear ratios and relative directions of rotation chosen for combinations II and I are tabulated in my application, Serial Number 426,808, filed February 8, 1930.

Resistances 53 (Fig. 1) may be used if it is desired to vary the rate of motive drive for the three combinations. The ratios above assumed are arbitrarily chosen, as meeting average conditions, but exact values are unimportant, as alignment is accomplished by effecting turns of the craft definitely related to the degree of azimuth rotation of the sight.

Each time the bomber puts the control at neutral when the sight intersects or nearly intersects the target, the turning of the craft is halted on a straight course which the pilot is enabled to hold by the exact automatic deviation of the lubber pointer 2, Fig. 4, relative to the stabilized reference pointer 1 in accord with every deviation of the craft from a straight or zero index heading. This intermittent momentary stopping between turns on a straight course has the advantage that the bomber can with precision note target drift due to misalignment of the course, independent of "apparent drift", which would be introduced by turning of the craft and the sight with it during the observation.

Starting the alignment when the craft reaches a predetermined position, the bomber closes switch 34 (Fig. 5), thus spinning the gyro rotor in case 7 and unlocking the reference pointer 1, also meshing worm 13 with the worm wheel 12. Assuming the target has just entered the optical field and appears considerably to the left of the random azimuth position of the bombsight reticule, the bomber instinctively pushes the control hard left, actuating combination III which, causes motive rotation of the pilot's lubber pointer 2 to the left. It is not the purpose of this specification to discuss immediately hereafter those numerous intricate details which pertain solely to the "sighting" phase of the bombsight pilot director combination.

The directional system has several advantages. The direct gyroscopic stabilization of reference pointer 1 without any transmission lag, in combination with motive deflected lubber pointer 2, provides continuous, instant, and exact indication of craft deviation in azimuth from the zero heading, and independent of bomber's manipulation and one devoid of any fluctuation of indication due to manual holding. The positive interconnection between the lubber pointer 2 deflection and the sight rotation, provides the bomber with instant movement of the sight corresponding to the pilot's turning of the craft, and provides the pilot with a turn signal exactly corresponding in a certain ratio to the turn of the sight observed by the bomber.

The separate control of motive rotation of the directional plane of sighting and of motive rotation of the range sight in that plane, each in directions corresponding to the apparent resulting movement of the sighting reticules, enables either synchronization or alignment to be adjusted in an instinctive manner each without interfering with the adjustment of the other.

I claim:

1. In a pilot director for aircraft the combination with a directional gyroscope, of a housing for mounting said gyroscope, a vertically extending pointer fixed to said gyroscope and controlled in azimuth thereby such that the apex thereof lies immediately beneath the longitudinal axis of the gyro rotor, a platform rotatably secured to said housing coaxial with the vertical axis of said gyroscope but mounted independent thereof and having a lubber pointer protruding therefrom adapted to register with said first pointer, means for rotatably adjusting said platform and lubber line with respect to said housing, a window in said housing for exposing said pointers through a predetermined angle and means for automatically realigning said pointers into a predetermined position with respect to said housing upon attainment of maximum clockwise or maximum counterclockwise gyroscope rotation relative to said housing.

2. In a pilot director for aircraft the combination with a directional gyroscope, of a housing for mounting said gyroscope, said housing having a longitudinal axis, a vertically extending pointer fixed to said gyroscope and controlled in azimuth thereby such that the apex thereof lies immediately beneath the longitudinal axis of the gyro rotor, said axes normally lying in a common vertical plane, a platform rotatably secured to said housing coaxial with the vertical axis of said gyroscope but mounted independent thereof and having a lubber pointer adapted to be adjusted into and out of registration with said first pointer, means for rotatably adjusting said platform and said lubber line with respect to said housing, a window in said housing for exposing through a predetermined angle said pointers to either side of the longitudinal axis of said housing, and means for automatically disconnecting said platform adjusting means from said platform and simultaneously realigning said first pointer and associated lubber pointer into plan alignment with the aforesaid longitudinal housing axis upon attainment by said pointers of predetermined angular deviation either side of the aforesaid housing axis.

3. In an instrument, a direction indicator, a signaling indicator adapted to be displaced from a predetermined starting position corresponding to the starting position of said direction indicator in the same or in opposite sense to the direction of indication of said direction indicator, and means simultaneously zeroing both indicators upon predetermined angular movement in either direction of said signaling indicator from its initial position.

4. In an instrument, a direction indicator, a signaling indicator adapted to be displaced, at will, from a predetermined starting position corresponding to the starting position of said direction indicator in the same or in opposite sense to the direction of indication of said direction indicator, and means simultaneously zeroing both indicators upon predetermined angular movement in either direction of said signaling indicator from its initial position.

5. In an instrument having a housing, a gyro direction indicator carried by said housing, a signaling indicator within said housing adapted to be displaced, at will, from plan coincidence with the longitudinal axis of said housing, and means simultaneously zeroing both indicators upon predetermined angular movement in either direction of said signaling indicator from plan coincidence with the aforesaid housing axis.

6. A pilot director for aircraft comprising in combination a direction device including indicating means fixed thereto, a platform rotatable independent of said direction device including a second pointer adapted to register with said first pointer, means for shifting said second pointer in azimuth to signal change in aircraft course, and means for simultaneously returning said device and pointers into registration in a predetermined position upon predetermined azimuth displacement of said second pointer relative to said first mentioned pointer.

7. A pilot director for aircraft comprising in combination a direction device including a pointer fixed thereto, a housing for mounting said direction device, a platform rotatably mounted in said housing in co-axial relation with but independent of said direction device and including a second pointer adapted to register with said first pointer, means for shifting said second pointer in azimuth, means for simultaneously returning said device and pointers into registration in a predetermined position upon predetermined relative azimuth displacement of said pointers, and a window within said housing for observing relative angular travel of said pointers.

8. A pilot director for aircraft comprising in combination a directional gyroscope including a pointer fixed thereto, a housing for mounting said directional gyroscope, a platform rotatably mounted in said housing in co-axial relation with but independent of said directional gyroscope and including a second pointer adapted to register with said first pointer, means for shifting said second pointer in azimuth, means for simultaneously returning said device and pointers into registration in a predetermined position upon predetermined relative azimuth displacement of said pointers, and a window within said housing for observing relative angular travel of said pointers.

HENRY B. INGLIS.